UNITED STATES PATENT OFFICE.

WILLIAM SPEIRS SIMPSON AND HOWARD OVIATT, OF LONDON, ENGLAND.

METALLURGY OF IRON AND STEEL.

1,061,950.   Specification of Letters Patent.   Patented May 13, 1913.

No Drawing.   Application filed November 22, 1909.   Serial No. 529,338.

*To all whom it may concern:*

Be it known that we, WILLIAM SPEIRS SIMPSON, a subject of the King of Great Britain, and HOWARD OVIATT, a citizen of the United States of America, residing at London, England, have invented certain new and useful Improvements in the Metallurgy of Iron and Steel, of which the following is a specification.

This invention has for its object the reduction of iron oxids and the production of refined iron containing 99% and upward of Fe, from various ores in which iron occurs as an oxid, or the production of steel of various commercial qualities directly from such ores. The method or process is adaptable to any form of iron oxid capable of being crushed or ground for mixing purposes as hereinafter set forth and is peculiarly adapted to the economical treatment of concentrates or of ores already existing in a state of fine division as natural products, such as magnetic iron sands whether titaniferous or otherwise.

In carrying out the purposes of the invention we prepare an ore-charge by thoroughly mixing any convenient quantity of suitable iron ore which if not already in a comparatively fine state of division has been ground or pulverized, with a suitable quantity of a finely ground metallic chlorid such as the chlorid of sodium, or its equivalent, such for example as the chlorid of potassium, calcium, magnesium, strontium, barium or aluminium. The quantity of such chlorid required varying according to the character thereof and the character of the ore under treatment. Under most conditions the chlorid of sodium is the more convenient and economical and the quantity required per ton of ore varies from 10% to 25% of the weight thereof, ores containing a high percentage of phosphorus or sulfur requiring more of the metallic chlorid than ores less impregnated with such impurities. Such ore-charge must also be provided (if not already existing in adequate proportions in the ore) with a suitable quantity of silica or silicious material and with an adequate quantity of one or more of certain bases, such as lime, magnesia and alumina, all finely ground and employed in most cases in proportions representing about two parts of silica to three parts of basic material which is usually adequate to form a readily fusible and liquid slag and which may represent in quantity from 15% to 30% of the weight of the ore-charge. The proportions of such slag composition may be varied so that it may be rendered either acid or basic as best suited to hearth linings or other conditions present during the ore treatment.

The oxids of iron when subjected to adequate heat, out of the air, in the presence of silica and a metallic chlorid (such for example as sodium chlorid) may be reduced to metal without the employment of carbonaceous reducing agents of any kind. Under suitable thermal conditions and in contact with the oxids of iron and of silicious material the constituents of various metallic chlorids are apparently dissociated and simultaneously metallic iron is produced. Thus with sodium chlorid the silicate of soda is invariably formed and the synthesis thereof seems to be an essential factor in the whole operation. The results obtained are uniform and the whole process is efficient, rapid and economical. It promises to be of great commercial utility.

In some cases especially in treating titaniferous ores, manganese dioxid, in the form of manganese ore or otherwise, may be added to the ore-charge and thoroughly mixed therewith; the quantity of such dioxid varying from two to six per cent. or upward of the weight of the ore-charge, according to the character of the ore.

If steel is to be produced directly from the ore instead of iron it is necessary that the ore-charge should contain in addition to the substances hitherto mentioned and (if the ore is titaniferous) including the manganese dioxid, a suitable quantity of a carburizing material either in finely divided form and intimately mixed with the ore-charge or in a less finely divided form and charged into the hearth before placing the ore-charge therein. Such carburizing material may consist of graphite (plumbago) or other suitable carbon such as a pure form of ground coke or anthracite coal and may be so employed as to uniformly carburize the steel to any desirable extent and at the will of the operator. The quantity of carbon required may vary from one per cent. to three per cent. (or upward) of the weight of the ore-charge; depending upon the character of the steel to be produced and upon the character of the carbon so employed. Or in some cases the carburizing material may be omitted from the ore charge in the first instance and added thereto after the slag has been formed and tapped off, in order to facilitate the melting of the iron and the carburization of the same.

The ore-charge having been prepared in the manner hereinbefore described may be placed in any suitable vessel, retort or receptacle having a suitable refractory and slag-resisting lining and then may be subjected to heat, out of contact with air, in any convenient manner or in any convenient form of furnace wherein it is practicable to create and maintain high temperatures such as a heat equal to or somewhat higher than the fusing point of pure iron or fine steel, approximately 3000° F. and upward. Or the prepared ore-charge may be subjected to the requisite heat in the open hearth of a furnace such as Siemen's regenerative furnace, fired by gas; provided however that the surface of the ore-charge is protected from atmospheric air and from the oxidizing influence of the flames or fumes of the furnace while working at high temperatures until such surface is covered by the fused slag resulting from the operation as hereinafter mentioned. In practice, and especially if employing a gas-fired open hearth furnace wherein the ore charge is heated from above, the chief objects of the process are either impaired or frustrated unless the contents of the ore-charge under treatment are adequately protected from oxidation. Otherwise much of the reduced metal while still in specular form or in the form of spongy or unfused iron, becomes re-oxidized at a stage of the process when the reducing conditions or agencies are spent. It is requisite therefore that the surface and the upper strata of the ore-charge shall be protected from re-oxidation and the underlying materials composing the charge be kept from contact with air during the reduction of the iron oxids and the agglomeration of the metallic particles. If, however, a furnace be employed wherein the ore charge is heated only from beneath no precautions against re-oxidation of the reduced iron are necessary. A convenient and efficient method of protecting the ore-charge on the open furnace hearth until the necessary slag covering is formed, consists in spreading over it a thin layer of carbonaceous material such as coke-breeze or small coal, preferably anthracite, which under the high temperature of an oxidizing flame provides an atmosphere of CO at the surface of the ore-charge and so employed does not affect the underlying ore, or in some cases the carbonaceous material may be mixed with the upper strata of the ore charge. For the reasons stated it is obvious that ordinary air-blast smelting furnaces of all descriptions are unsuitable for this process. The furnace hearth should be made of or lined with a refractory material suitable for resisting the action of erosive slags. In most cases a chromite hearth or lining is efficient. In connection with the latter we are able to construct an open hearth furnace wherein the ore charge may be adequately heated either partly or altogether from underneath and all difficulties of re-oxidation are removed.

In treating ores containing a high percentage of phosphorus it is sometimes desirable to first subject the ore charge to a moderate heat of about 1500° F. for the space of one or more hours and afterward to apply the maximum heat to complete the operation.

In commercial operation it is in some cases desirable that when the molten iron or steel is tapped from the furnace there should be allowed to remain upon the hearth from 10% to 25% of the molten metal resulting from each operation, to assist in retaining the heat on the bottom of the hearth and also to form a bath of metal to receive each succeeding ore-charge; thus rendering the process a continuous one.

The time required for the direct production of malleable iron equal to the best refined iron and containing over 99% Fe or the production of superior steel of any desired carbon contents directly from the ore, by means of a Siemen's open hearth furnace as hereinbefore specified, varies from three hours for iron to six hours for steel; depending upon the magnitude and composition of the charge, the lining of the hearth and somewhat upon the character of the iron oxid under treatment.

If it is required to produce steel containing various other metals desirable as alloys, a suitable mixture of ores containing the metals required, in the desired proportions, may be brought together in the ore-charge and the requisite steel alloy will in most cases result from the one operation. Or any desirable metallic alloy may be added to the molten metal before or after tapping as in ordinary open hearth practice.

Although it is usually desirable that the ore to be treated should be in a fine state of division and although the best and most economical results are obtained when all substances contained in the ore-charge have been finely ground and brought into intimate contact each with the other before being subjected to heat, the application of this process may not be entirely limited thereto; but an ore-charge may be prepared in the manner hereinbefore indicated wherein part or all of the substances composing the same may have been only brought into a state of comparatively fine division such as ores and other substances which may not have been crushed to uniform fineness or which may not have been screened after crushing so that some portions thereof may have been rendered as fine as sand and other portions may contain coarser grains or lumps of various sizes.

It is to be understood that the term "silica" in the claims is used broadly to include such silica or silicious material as may occur in or be native to the ore.

We claim,

1. The herein described process of producing refined metallic iron from ores containing the oxids of iron, which consists in subjecting an ore charge containing the ore and suitable quantities of sodium chlorid and silica in a fine state of division, to a high degree of heat for a period sufficient to effect the reduction of the iron oxids to metallic iron.

2. The herein described process of producing refined metallic iron from ores containings the oxids of iron, which consists in subjecting an ore charge containing the iron ore and suitable quantities of sodium chlorid and silica, to a high degree of heat in such a manner as to exclude free access of air for a period sufficient to effect the reduction of the iron oxids to metallic iron.

3. An improvement in the art of reducing ores containing the oxids of iron which involves subjecting an ore charge containing the iron ore and suitable quantities of sodium chlorid and silica to heat of a temperature equal to or greater than the fusing point of pure iron and for a period sufficient to reduce the oxids of iron to metallic iron.

4. An improvement in the art of reducing iron oxid ores which involves mixing an ore charge containing the iron ore and suitable quantities of sodium chlorid and silica, and subjecting the same to heat in an open hearth furnace under a layer of carbonaceous material to exclude the free access of air, for a period sufficient to effect the desired result.

5. The herein described improvement in the art of reducing ores containing oxids of iron which consists in heating such ores while excluding free access of air and while in contact with a suitable chlorid such as the chlorid of sodium mixed with silica to a temperature equal to or greater than the fusing point of pure iron and for a period of time sufficient to reduce the oxids of iron to metallic iron.

6. The herein described process of producing refined metallic iron from ores containing oxids of iron which consists in subjecting an ore charge containing the iron ore, suitable quantities of sodium chlorid, silica, and a basic fluxing material in a state of fine division, to heat while substantially out of contact with air and of a temperature equal to or greater than the fusing point of pure iron for a period sufficient to reduce the oxids of iron to refined metallic iron.

7. The herein described process of producing refined metallic iron from titaniferous iron oxid ores, which consists in subjecting an ore charge containing the ground or finely divided ore, sodium chlorid, silica, a basic material, and manganese dioxid, to heat with exclusion of free access of air for a period sufficient to effect the desired result.

8. An improvement in the art of producing refined iron from titaniferous oxid ores, which consists in subjecting an ore charge containing the ground ore, manganese dioxid, chlorid of sodium, silica and a basic fluxing material, to a high degree of heat for a period sufficient to effect the desired result.

9. The herein described process of producing refined metallic iron from iron oxid ores containing sulfur or phosphorus, which consists in subjecting an ore charge containing the ground or finely divided ore mixed with suitable quantities of sodium chlorid and silica together with a basic material, primarily to moderate heat and afterward to a high heat in such a manner as to exclude free access of air for a period sufficient to effect the desired result.

10. The herein described process of producing steel directly from iron oxid ores, which consists in subjecting an ore charge containing iron ore and sodium chlorid, silica, basic fluxing materials and a suitable carbonaceous material to carburize the reduced metal to the desired degree, to a high degree of heat while substantially out of contact with air and for a period sufficient to effect the desired result.

11. The herein described process of producing steel directly from oxid iron ores, which consists in subjecting an ore charge containing the ground or finely divided ore mixed with suitable quantities of sodium chlorid, silica and a basic fluxing material, together with manganese dioxide and carbonaceous material sufficient in quantity to carburize the reduced metal to the desired degree, to heat with the exclusion of free access of air for a period sufficient to effect the desired result.

12. The herein described improvement in the art of reducing iron oxids without the use of carbonaceous reducing agents which consists in heating the oxids of iron substantially out of contact with air and in the presence of the chlorid of sodium and silica whereby the constituents of the metallic chlorid are dissociated and simultaneously metallic iron is produced.

13. The herein described improvement in the art of producing refined iron from iron ores containing sulfur or phosphorus, which consists in dissociating, under suitable thermal conditions, the constituents of sodium chlorid in the presence of iron oxids and silica, and thereby allowing the liberated chlorin to act as a dephosphorizing and desulfurizing agent.

14. The herein described improvement in the art of producing refined iron from iron ores containing sulfur or phosphorus, which consists in intimately mixing the ore, with sodium chlorid and silica and dissociating the constituents of the sodium chlorid, under suitable thermal conditions without free access of air thereby allowing the liberated chlorin to act as a dephosphorizing and desulfurizing agent.

In testimony whereof we have hereunto set our hands in presence of two subscribing witnesses.

WILLIAM SPEIRS SIMPSON.
HOWARD OVIATT.

Witnesses:
RICHARD COXE GARDNER,
HAROLD COXE GARDNER.

Copies of this patent may be obtained for five cents each, by addressing the "Commissioner of Patents, Washington, D. C."